United States Patent Office 3,014,072
Patented Dec. 19, 1961

3,014,072
1-PANTOYL-2-ARALKYL HYDRAZINES
Thomas Samuel Gardner, Rutherford, John Lee, Montclair, and Edward Wenis, Leonia, N.J., assignors to Hoffmann-La Roche Inc., Nutley, N.J., a corporation of New Jersey
No Drawing. Filed Sept. 29, 1959, Ser. No. 843,041
3 Claims. (Cl. 260—562)

This invention relates to 1-pantoyl-2-benzyl-hydrazine, 1-pantoyl-2-di-lower alkylaminobenzyl-hydrazine and acid addition salts of said compounds. In the above compounds, the pantoyl radical refers to the 2,4-dihydroxy-3,3-dimethylbutyryl group. Lower alkyl groups contemplated are straight chain and branched chain saturated aliphatic hydrocarbon groups having up to about 7 carbon atoms, e.g. methyl, ethyl, propyl, isopropyl, butyl, isobutyl, amyl and the like. D, L and DL forms are all within the scope of this invention.

Acid addition salts formed by the pantoyl-aralkyl hydrazines include those formed by reaction with inorganic and organic acids, primarily strong acids, such as the hydrohalic acid and other mineral acids, such as phosphoric, sulfuric, nitric and the like, sulfonic acids, such as the alkanesulfonic acids, e.g. methanesulfonic acid and ethanesulfonic acid, and arylsulfonic acids, e.g. benzenesulfonic acid, toluenesulfonic acid and other organic acids, such as formic acid, trichloracetic acid, oxalic acid and the like.

The compounds described above are useful as antidepressants. The products of this invention are amine oxidase inhibitors which stimulate the central nervous system and are particularly useful in psychotherapy for treating depressed or disturbed states. They may be administered orally or parenterally in conventional dosage forms, such as tablets, capsules, injectables, etc., produced by combining therapeutic dosages of the free hydrazine or a medically acceptable acid addition salt with the conventional liquid or solid vehicle used in pharmaceutical practice.

The pantoyl-aralkyl hydrazines are produced by reacting pantoyllactone with a hydrazine such as benzyl-hydrazine or di-lower alkylaminobenzyl-hydrazine, e.g. dimethylaminobenzylhydrazine, diethylaminobenzyl - hydrazine, etc., preferably in a solvent such as ethanol, at about reflux temperature as more fully described in the examples below. The acid addition salts thereof are produced by reacting approximately equimolecular proportions or an excess of the free hydrazine with the appropriate inorganic or organic acid.

The following examples are illustrative of the invention. All temperatures are stated in degrees centigrade.

Example 1

60 g. of D-pantoyllactone (2,4-dihydroxy-3,3-dimethylbutyrolactone) and 70 g. of benzyl-hydrazine were heated at reflux in 500 ml. of ethanol for 6 hours. The solution was concentrated to 100 ml., then chilled for 2 days at 4°. The product, D-1-pantoyl-2-benzyl-hydrazine, crystallized, then was recrystallized from ethyl acetate, M.P. 84–85°.

*Analysis.*—Calculated for $C_{13}H_{20}N_2O_3$: C, 61.9; H, 8.0. Found: C, 61.7; H, 8.1.

To about 2 g. of D-1-pantoyl-2-benzyl-hydrazine in sufficient hot ethanol to dissolve the material was added a 10% excess over the stoichiometric proportion of hydrogen chloride dissolved in ethanol. After cooling, ether was added to precipitate D-1-pantoyl-2-benzyl-hydrazine hydrochloride, M.P. 135–137°.

D-1-pantoyl - 2 - benzyl-hydrazine p - toluenesulfonate, M.P. 146–147°, and D-1-pantoyl-2-benzyl-hydrazine phosphate, M.P. 171–172°, were prepared by the same procedure described above except that the salt precipitated immediately upon cooling the ethanol solution.

Example 2

16.5 g. of p-dimethylaminobenzyl-hydrazine and 13 g. of D-pantoyllactone in 50 ml. of ethanol were refluxed for 2 hours. The solution was concentrated to one-half volume and on storing at 4° for 7 days, the product crystallized. The D-1-pantoyl-2-(4-dimethylaminobenzyl)-hydrazine was recrystallized from ethyl acetate, M.P. 104–105°.

*Analysis.*—Calculated for $C_{15}H_{25}N_3O_3$: C, 60.9; H, 8.5. Found: C, 60.87; H, 8.27.

We claim:
1. A compound selected from the group consisting of 1-pantoyl-2-benzyl-hydrazine, 1-pantoyl-2-(di-lower alkylaminobenzyl)-hydrazine and medicinally acceptable acid addition salt sthereof.
2. 1-pantoyl-2-benzyl-hydrazine.
3. 1-pantoyl-2-(4-dimethylaminobenzyl)-hydrazine.

References Cited in the file of this patent
UNITED STATES PATENTS

| | | |
|---|---|---|
| 2,900,388 | Tien | Aug. 18, 1959 |
| 2,912,461 | Donovan | Nov. 10, 1959 |

FOREIGN PATENTS

| | | |
|---|---|---|
| 578,251 | Great Britain | June 20, 1946 |

OTHER REFERENCES
Wieland: Hydrazine, 1913, pages 45, 46.